United States Patent [19]

Mizuta

[11] Patent Number: 5,695,424

[45] Date of Patent: Dec. 9, 1997

[54] PLANETARY CARRIER HAVING A POROUS WASHER

[75] Inventor: Muneo Mizuta, Fuji, Japan

[73] Assignee: JATCO Corporation, Fuji, Japan

[21] Appl. No.: 547,220

[22] Filed: Oct. 24, 1995

[30] Foreign Application Priority Data

Oct. 28, 1994 [JP] Japan .................. 6-264940

[51] Int. Cl.$^6$ .................. F16H 1/28; F16H 57/04
[52] U.S. Cl. .................. 475/159; 475/331; 475/348; 184/6.12; 384/424; 384/569; 384/902; 384/368
[58] Field of Search .................. 475/159, 160, 475/331, 348; 184/6.12, 11.1, 13.1; 411/534; 384/368, 902, 127, 504, 569, 424

[56] References Cited

U.S. PATENT DOCUMENTS

| | | | |
|---|---|---|---|
| 2,093,800 | 9/1937 | May .................. | 384/368 |
| 4,480,492 | 11/1984 | Fujioka et al. .................. | 184/6.12 X |
| 4,776,237 | 10/1988 | Premiski et al. .................. | 475/159 |
| 4,826,396 | 5/1989 | Blount .................. | 384/368 X |
| 5,120,140 | 6/1992 | Nakagawa et al. .................. | 384/902 X |
| 5,188,576 | 2/1993 | Maguire et al. .................. | 475/348 |
| 5,302,160 | 4/1994 | Fujioka .................. | 475/348 |
| 5,356,352 | 10/1994 | Sakamoto et al. .................. | 475/348 |
| 5,368,528 | 11/1994 | Farrell .................. | 384/564 X |
| 5,490,730 | 2/1996 | Akita et al. .................. | 384/902 X |

FOREIGN PATENT DOCUMENTS

| | | | |
|---|---|---|---|
| 4029-373 | 3/1992 | Germany .................. | 475/331 |
| 3-209019 | 9/1991 | Japan .................. | 384/902 |
| 5-223141 | 8/1993 | Japan .................. | 475/348 |
| 6-207651 | 7/1994 | Japan .................. | 475/331 |
| 146861 | 9/1954 | Sweden .................. | 384/564 |

OTHER PUBLICATIONS

S. Russ, "Anwendung und Auswahlkriterien von Sintergleitlagern in der Feinwerktechnik", Maschinenmarkt, vol. 87, No. 84, Oct. 1981, pp. 1745–1748.

*Primary Examiner*—Charles A. Warmor
*Assistant Examiner*—Nathan O. Jensen
*Attorney, Agent, or Firm*—Foley & Lardner

[57] ABSTRACT

A planet carrier of an automotive automatic transmission includes an annular main body portion disposed around a pinion shaft between the carrier body and the pinion gear. A washer formed of a porous material such that lubricating fluid can flow therethrough to both sides of the washer is disposed around the pinion shaft. Further, a boss portion may be formed at the inner periphery of the washer opening, which portion is inserted between the surface of the pinion shaft and an inner circumference of the pinion gear. A fluid passage is defined according to installation of the washer, between the edge of the washer and the bearings of the pinion gear such that lubricating fluid is retained therein, which fluid flows around the pinion shaft.

6 Claims, 3 Drawing Sheets

PLANETARY CARRIER HAVING A POROUS WASHER

FIELD OF THE INVENTION

The present invention relates to a washer for a pinion carrier of a planetary gear set or the like. Specifically, the present invention relates to a washer for a carrier of a planetary gear set installed in an automotive automatic transmission.

DESCRIPTION OF THE RELATED ART

Generally, the structure and arrangement of a washer, or washer, utilized for a planet carrier of a planetary gear set of an automotive automatic transmission will be explained herein below with reference to FIGS. 3a, 3b, 4a, 4b. Such a conventional arrangement has been disclosed, for example, in Nissan Service Manual for Electronically Controlled Automatic Transmission Model RE4R01A (Published March 1988 by Nissan Motor Co., Ltd.).

Referring to FIG. 3a, a plan view of such a washer for a planet carrier is shown. As may be seen, the washer 01 is provided with stop flanges 01a, 01a at two locations, projected from the outer circumference thereof. Referring to FIG. 3b, the above-described washer 01 is shown in an installed condition on a planetary gear set. As may be seen, the washer 01 is layered with another, flat, washer 04, and both are interposed between the body of a planet carrier 02 and a pinion gear 03. For providing lubrication to the pinion gear, a fluid circuit 06 is provided within a pinion shaft 05 for supplying lubricating fluid to the pinion gear.

In addition, another known conventional arrangement for such a washer arrangement for a planet carrier of an automotive automatic transmission is shown in FIGS. 4a, 4b. Referring to FIG. 4a, plan and cross-sectional views of this type of conventional washer are shown. As may be seen, an annular washer 07 is formed of a metallic layer 07b and a back metal layer 07c, and a projecting portion 07a is formed on a peripheral surface thereof. An opening is defined in a central portion of the annular washer 07. Referring to FIG. 4b it may be seen that the washer 07 is interposed between the carrier body 02 and a pinion gear 03 such that the projecting portion 7a is received in a recess provided in the carrier body 02. As in the previous example, the washer 07 is layered together with a flat washer 04, and a fluid circuit 06 provides lubricating fluid to the pinion gear through the pinion shaft 05.

The carrier body 02 receives thrusting force according to rotation of the pinion gear 03. Generally, such a carrier body 02 is manufactured in consideration of weight, cost, and ease of production, usually formed by press processing of aluminum or other relatively common, low cost material. According to this, it is necessary to provide a washer, which is prevented from rotating between the rotational elements (i.e. pinion gear 03) of the pinion carrier and the carrier body 02, to prevent increased friction between the carrier body 02 and the pinion gear(s) 03. Further, to prevent adhesion between an edge of the pinion gear 03 and the surface of the carrier washer 01, 07, a second flat washer 04 is provided between the carrier washer 01, 07 and the pinion gear 03.

According to the above-described conventional carrier washer structures, a number of parts necessary for assuring reliable functioning of the planetary gear set is increased, this of course incurs higher costs for manufacture and assembly.

In addition, according to the known arrangements, it is necessary to provide a fluid circuit through a rotational element such as a pinion shaft to provide lubrication to the pinion gear. Thus, the costs and complexity of these parts is also increased.

Thus, it has been required to provide a carrier structure including a carrier washer arrangement that is low in cost, simple in structure and by which a total number of parts may be reduced. Further, it is desirable to provide a carrier washer structure by which the cost and complexity of associated rotational elements, and the like, may also be reduced.

SUMMARY OF THE INVENTION

Thus, it is an object of the present invention to overcome the drawbacks of the related art.

It is a further object of the invention to provide a washer for a planet carrier that may be simply fabricated at low cost, and that does not necessitate provision of a fluid circuit or the like in associated parts.

According to one aspect of the invention, a planet carrier for an automatic transmission has a carrier body, a pinion shaft, a pinion gear, a bearing assembly, and a washer. The carrier body supports the pinion shaft. The bearing assembly is interposed between the pinion shaft and the pinion gear for rotatably supporting the pinion gear about the pinion shaft. The washer is formed of a porous material and is disposed between the carrier body and the pinion gear. The porous material can be comprised of metallic powder, which is heated. The washer extends toward the pinion shaft and cooperates with the bearing assembly to define a lubricating channel between the pinion gear and the pinion shaft. The washer is adapted to convey lubricating fluid to the lubricating channel.

The washer has a central opening receiving the pinion shaft. It also can have a boss portion extending from the periphery of the central opening in the axial direction (relative to the pinion shaft). The boss portion extends between the pinion gear and the pinion shaft and is opposed to the bearing assembly to define the lubricating channel between them.

The washer defines a passage or passages for conveying lubricating fluid to the lubricating channel. The washer also serves as a medium to minimize friction between the pinion gear and the carrier body. The washer can be disposed on each axial side of the pinion gear.

DESCRIPTION OF THE PREFERRED EMBODIMENT

Figure 1:
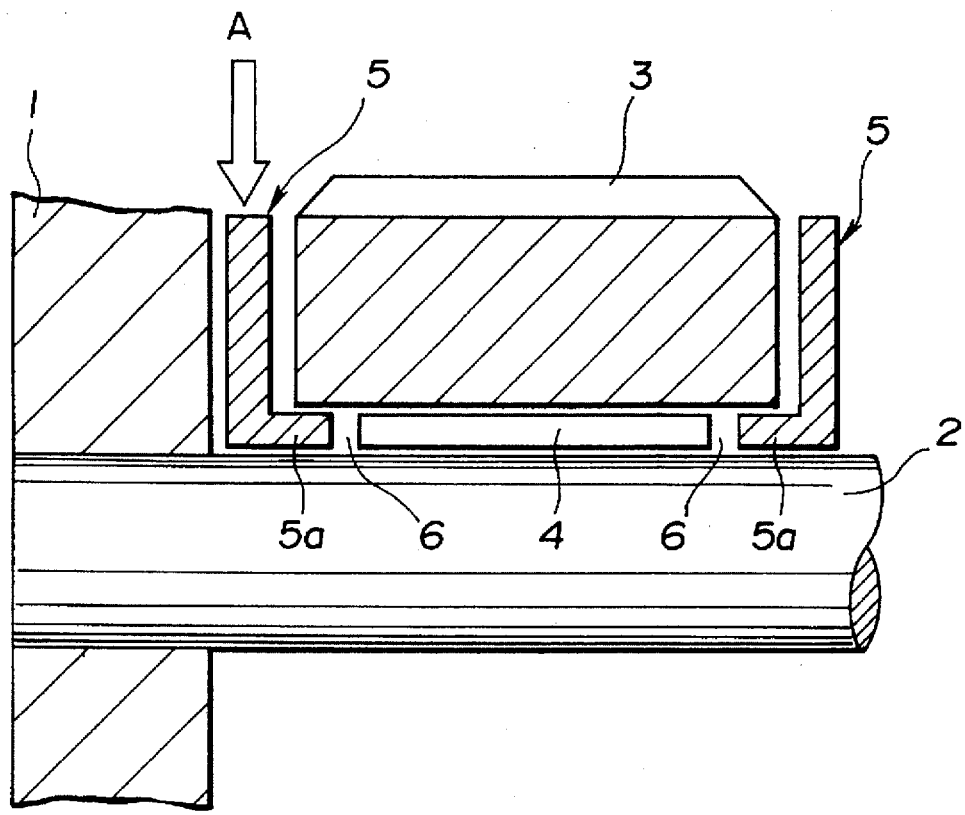
FIG. 1 is a cross-sectional side view of a washer for a planet carrier according to a first embodiment of the invention.

Hereinbelow, a preferred embodiment of the invention will be explained in detail with reference to the drawings. Referring to FIG. 1 a first preferred embodiment of a washer for a planet carrier of an automotive automatic transmission will be described in detail.

A washer 5 according to the first embodiment is shown in FIG. 1. A planet carrier includes a carrier body 1 which supports a pinion shaft 2. A pinion gear 3 is rotatably supported on the pinion shaft 2 via a plurality of needle bearings 4 interposed between the circumferential surface of the pinion shaft 2 and the inner circumferential surface of the pinion gear 3. According to the first embodiment, washers 5, 5 are provided at both thrust producing sides of the pinion gear 3.

Each washer 5 is formed of a porous metallic surface material having a plurality of small holes therethrough. Further, the inner circumference of the Washer 5 is formed with a boss portion 5a projected therefrom in the axial direction. According to installation of the washer 5 on the carrier 2, the boss portion 5a is projected between the inner circumference of the pinion gear 3 and the outer peripheral surface of the pinion shaft 2. Further, a projected length of each boss portion 5a is determined in accordance with a dimension of the needle bearings 4 such that a lubricating groove 6, 6 is defined at each side of the needle bearings 4 between end portions thereof and facing sides of the boss portions 5a, 5a of the washers 5, 5.

According to the present embodiment the washer 5 is formed of a powdered metal subjected to heat processing such as sintering or the like during forming to provide a porous metallic washer 5. Further, sponge material, Ni catalyst, or catalyst for removing a single material from a porous base material, or the like, may be included for introducing porous properties. Alternatively, an organic material may be utilized as the porous material or an Cu—Sn alloy may be utilized for producing a porous metallic material suitable for the washer of the invention.

According to the above structure, the washer 5 according to the invention is operable such that, according to fluid supply during operation, lubricating fluid moves in the direction of the arrow A of FIG. 1. According to this, the porous openings of the metallic washer 5 become saturated with lubricating fluid. The lubricating fluid is led in the direction of the arrow A during transmission operation and thus finally is led through the boss portion 5a to the lubricating groove 6. Thus, the inner circumference of the pinion gear 3, the needle bearings 4, and the boss portion 5a serve to retain lubricating fluid without pressure, such that sufficient lubrication of the pinion gear 3 is reliably accomplished.

Figure 2:
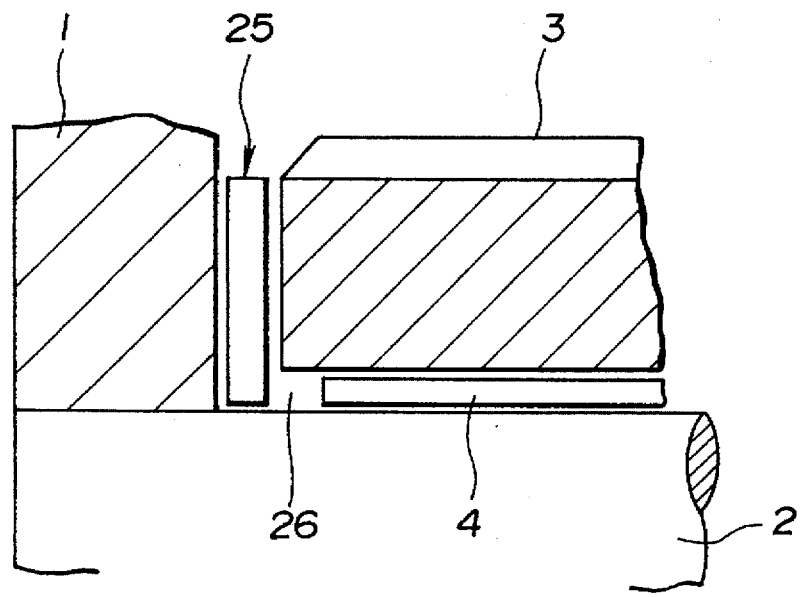
FIG. 2 is a cross-sectional side view of a washer for a planet carrier according to a second embodiment of the invention.
Figure 3A:
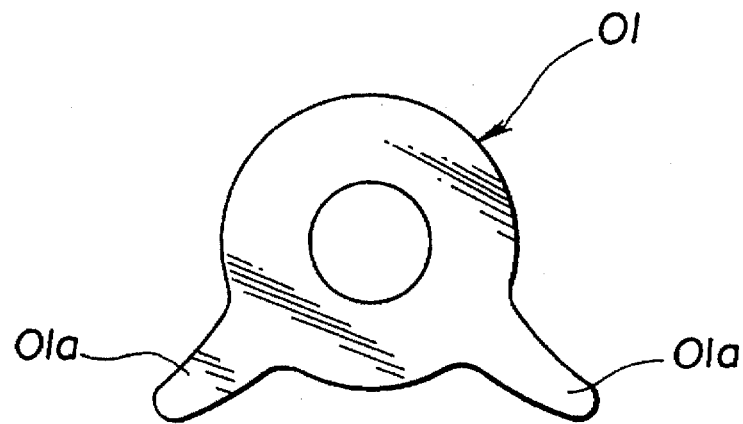
FIG. 3a is a plan view of a conventional washer utilized for a carrier of a planetary gear set of an automotive automatic transmission.
Figure 3B:
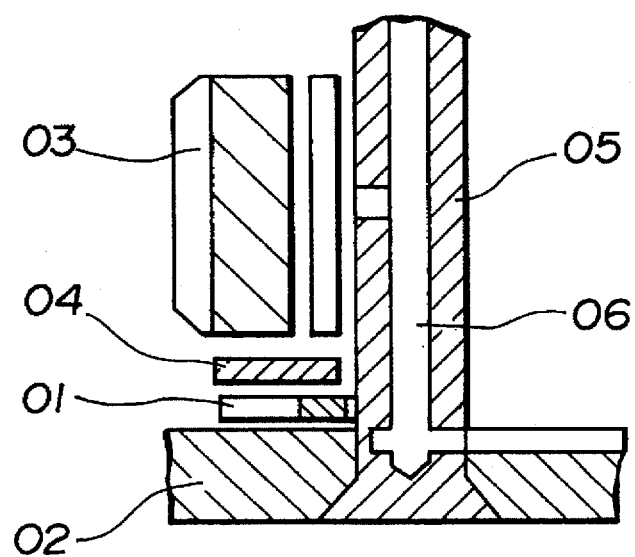
FIG. 3b is a cross-sectional view of the conventional washer of FIG. 3a in a carrier assembly.
Figure 4A:
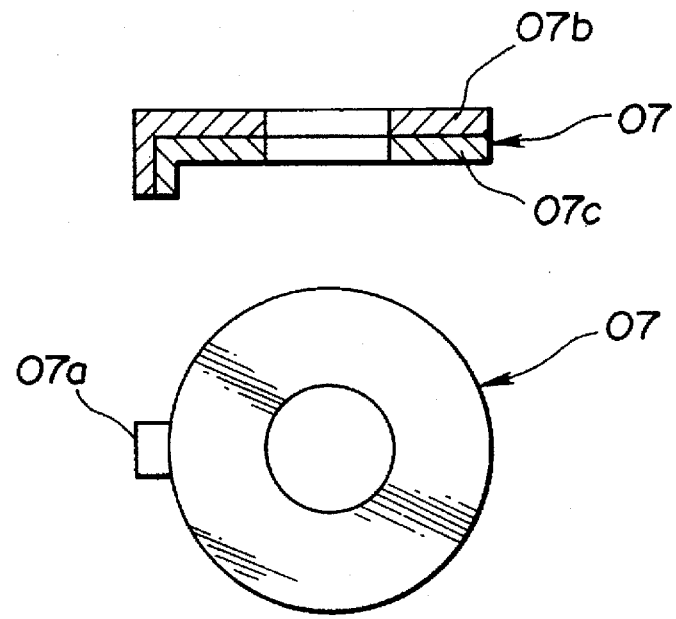
FIG. 4a shows plan and cross-sectional views of another type of conventional washer in use for a carrier of a planetary gear set in an automotive automatic transmission.
Figure 4B:
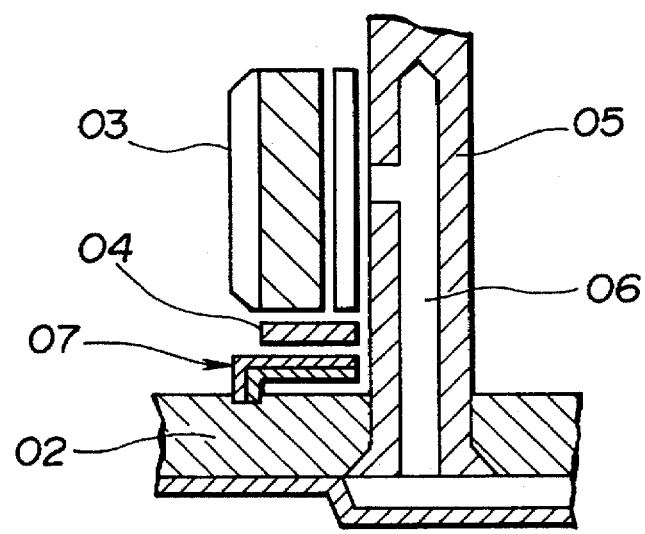
FIG. 4b is a cross-sectional view of the conventional washer of FIG. 4a in a carrier assembly.

Referring now to FIG. 2 a second preferred embodiment of a washer 25 for a planet carrier of an automotive automatic transmission will be described in detail.

In large part the structure of the second embodiment is the same as the above-described first embodiment, therefore, redundant description will be omitted for brevity. As may be seen in FIG. 2, a washer 25 according to the second preferred embodiment is formed without the boss portion 5a of the first embodiment. Further, the washer may be provided on one or both sides of the pinion gear. A central circular opening of the washer 25 receives the pinion shaft 2. As with the previous embodiment, the lubricating fluid is led to the inner edge surface of the washer 25 via the porous material thereof and is retained between the needle bearings 4, the washer inner surface 25, and the pinion gear 3 so as to be channeled in a lubricating groove 26 and provide sufficient lubrication to the pinion gear 3. According to this, all the same advantages of the above described first preferred embodiment may be reliably obtained.

According to provision of the lubricating groove 6, 26 lubricating fluid therein is continuously held around the pinion shaft 2 in the vicinity of the pinion gear 3, thus preventing drying or burning of lubricating fluid during operation of the transmission. Further, according to the disclosed structure, boundary lubrication between the carrier 1 and pinion gear 3 where a high frictional coefficient exists is assured. Thus, provision of an additional washer for reducing friction is not required.

Thus, according to the present invention as described hereinabove, there is provided a simple inexpensive structure of a washer for a pinion gear of a planetary carrier by which reliable operation and a reduced number of parts may be assured.

Further, according to the structure of the invention as herein set forth that, since the lubricating fluid is moved downward in the arrow direction A of FIG. 1 according to operation of the vehicular transmission, sufficient lubricating fluid is always maintained at the site of the pinion gear 3 and pinion shaft 2. Further, since the material of the washer is not merely provided with through holes, but is porous in nature, lubricating fluid is disposed at both sides of the washer at the surface of the pinion shaft, not only at the side of the lubricating groove 6, 26. Thus, lubrication is provided between the inner surface of the planetary carrier 1 and the facing side of the washer 5, 25 such that friction therebetween and/or attachment therebetween according to frictional heating during operation, is prevented. According to the disclosed structure, high boundary lubrication is established (i.e. a frictional coefficient generally between 10 and 100 is established at the boundary) may be assured.

It will be noted that, although the preferred embodiment is set forth in terms of a washer for a planetary carrier to be utilized in an automotive automatic transmission. However, the present invention may be embodied in various different ways without departing from the principle of the invention as set forth herein.

The present invention is not limited only to the description as herein disclosed but may be modified and embodied in other ways without departing from the scope or inventive concept of the invention as set forth above.

What is claimed is:

1. A planet carrier for an automatic transmission, comprising:

a carrier body;

a pinion shaft supported by the carrier body;

a pinion gear;

a bearing assembly interposed between the pinion shaft and the pinion gear for rotatably supporting the pinion gear about the pinion shaft; and a washer formed of a porous material disposed between the carrier body and the pinion gear, wherein the washer extends toward the pinion shaft and cooperates with the bearing assembly to define a lubricating channel between the pinion gear and the pinion shaft, the washer being adapted to convey lubricating fluid to the lubricating channel.

2. A planet carrier according to claim 1, wherein the washer has a central opening receiving the pinion shaft and a boss portion extending from the washer, the boss portion extending between the pinion gear and the pinion shaft and being opposed to the bearing assembly to define the lubricating channel therebetween.

3. A planet carrier according to claim 1, wherein the porous material is comprised of metallic powder, which is heated.

4. A planet carrier according to claim 1, wherein the washer is disposed on each axial side of the pinion gear.

5. A planet carrier according to claim 1, wherein the washer defines passages for conveying the lubricating fluid to the lubricating channel.

6. A planet carrier according to claim 1, wherein the washer serves as a medium to minimize friction between the pinion gear and the carrier body and also serves as a passage conveying the lubricating fluid to the lubricating channel.

* * * * *